United States Patent
Blanc

(10) Patent No.: US 6,234,297 B1
(45) Date of Patent: May 22, 2001

(54) DEVICE FOR CONVEYING PRODUCTS, IN PARTICULAR FRUIT

(75) Inventor: Philippe Blanc, Montauban (FR)

(73) Assignee: Materiel pour l'Arboriculture Fruitiere, Montauban (FR)

(*) Notice: Subject to any disclaimer, the term of this patent is extended or adjusted under 35 U.S.C. 154(b) by 0 days.

(21) Appl. No.: 09/432,609

(22) Filed: Nov. 3, 1999

(30) Foreign Application Priority Data

Nov. 13, 1998 (FR) .................................................. 98 14278

(51) Int. Cl.⁷ .................................................. B65G 47/46
(52) U.S. Cl. ........................................ 198/370.04; 209/912
(58) Field of Search ........................... 198/370.04, 477.1; 209/515, 647, 648, 912

(56) References Cited

U.S. PATENT DOCUMENTS

| | | | | |
|---|---|---|---|---|
| 3,848,728 | * | 11/1974 | Leibrick et al. | 198/320.04 |
| 4,089,404 | * | 5/1978 | Venzke | 198/370.04 |
| 4,586,613 | | 5/1986 | Horii . | |
| 5,477,955 | * | 12/1995 | Madden et al. | 198/370.04 |

FOREIGN PATENT DOCUMENTS

| | | |
|---|---|---|
| 2 716 874 | 9/1995 | (FR) . |
| WO 93/09772 | 5/1993 | (WO) . |

* cited by examiner

Primary Examiner—Joseph E. Valenza
(74) Attorney, Agent, or Firm—Young & Thompson

(57) ABSTRACT

The invention relates to a device for conveying products, in particular fruit, which is designed to provide transport of the said products, and comprises a plurality of conveyor carrier arms (9, 10), which are articulated on supports (7) which are supported by a longitudinal endless chain (1). According to the invention, each conveyor carrier arm (9, 10) comprises a hollow body (24) which is delimited by a peripheral edge (25), inside which there extends a sleeve (31) which accommodates a longitudinal articulation shaft (33), which is integral with the support (7), the said sleeve being connected to the peripheral edge (25) by a flexible unit (32) which can be deformed during a force of raising of the conveyor carrier arm (9, 10). In addition, each conveyor carrier arm (9, 10) comprises a recess (27), which is disposed such as to accommodate a longitudinal pin (28) which is integral with the support (7), in the position for transport of the conveyor carrier arm (9, 10), and to release the said pin during deformation of the flexible unit (32), derived from a force of raising of the said conveyor carrier arm.

18 Claims, 4 Drawing Sheets

DEVICE FOR CONVEYING PRODUCTS, IN PARTICULAR FRUIT

The invention relates to a device for conveying products, in particular fruit, which is designed to provide transport of the said products, and selected discharge of the latter at unloading areas, and comprising:
- a plurality of conveyor carrier arms, which are articulated on supports which are supported by a longitudinal endless chain, and are provided with units for maintenance of the said conveyor carrier arms in a position for transport of the products; and
- means for release, which are designed to generate selectively tilting of the conveyor carrier arms, for the purpose of discharge of the products supported by the latter in one of the unloading areas.

Conveyor devices of this type are used commonly at present in the fruit-growing industry, and are conventionally integrated into sorting units comprising an area for loading fruit, means for analysis of, and/or weighing the said fruit, and areas for unloading this fruit, in which the latter are discharged selectively according to the selection criteria determined.

A sorting unit of this type is described in particular in French patent FR 2,716,874, and comprises a conveyor device which contains an endless chain, which supports two series of facing supports, on each of which there is articulated a conveyor carrier arm, which is provided with a transverse central bar, on both sides of which longitudinal fingers are distributed.

Although at present conveyor devices of this type are very reliable, they are relatively complex, for example as a result of the design of the units for release of the conveyor carrier arms which are supported by the supports, or the arrangement of these supports, which are mounted on both sides of endless chains, and which in particular make it necessary to provide a support structure which can accept the differences of loading of the two conveyor lines carried by a single endless chain.

In particular, the units for release of the conveyor carrier arms consist of numerous moving parts, the ageing and wear of which lead to relatively high maintenance costs, and frequent operative stoppages.

The object of the present invention is to eliminate these disadvantages, and its main objective is to provide a conveyor device which has a very simple design, and of which the cost price and maintenance costs are reduced substantially in comparison with those of the present conveyor devices.

Another objective of the invention is to provide a conveyor device which has a transverse dimension which is reduced in comparison with the present conveyor devices.

Another objective of the invention is to provide a conveyor device which can permit transport and sorting of fruit of very different sizes and/or shapes.

For this purpose, the invention relates to a conveyor device as described in the preceding preamble, wherein:
- each conveyor carrier arm is extended transversely by a hollow body delimited by a peripheral edge, inside which there extends a longitudinal sleeve which accommodates a longitudinal articulation shaft, which is integral with the support, the said sleeve being connected to the peripheral edge by a transverse flexible component, which can be deformed during a force of raising of the conveyor carrier arm, disposed in its position for transport of the products; and
- the units for maintenance of the conveyor carrier arms in their position for transport of the products comprise a recess which is provided in the body of the said conveyor carrier arm, and a longitudinal pin which is integral with the support, and is designed to be accommodated in the recess, in the position for transport of the conveyor carrier arms, the said recess being disposed such as to release the pin during deformation of the flexible unit, derived from a force of raising of the said conveyor carrier arms.

According to the invention and firstly, the articulation of each conveyor carrier arm on a support, and release of this conveyor carrier arm for the purpose of tilting of the latter, are obtained by means of a number of parts which is reduced in an optimum manner, of which only one is in motion, ie. the conveyor carrier arm itself.

Consequently, the cost price of the conveyor units of the conveyor device is optimised, and maintenance of the latter is greatly reduced, owing to the absence of parts which are liable to wear, as a result of friction forces.

In addition, the design of the articulation of the conveyor carrier arm, the articulation shaft of which is offset transversely relative to the surface which supports the product, provides a positive opening for the said conveyor carrier arm, and instantaneous and quasi-vertical dropping of the product, when the tilting has been triggered.

In practice, this design provides a significant transverse reduction of size of the conveyor device in comparison with that of the present conveyor devices. In fact, in the case of the latter, and in particular that which is described in patent FR 2,716,874, the fruit falls according to an oblique path which moves it away from the support, by a distance which is variable according to the speed of travel of the conveyor device. On the other hand, according to the invention, the products drop vertically, and thus the transverse size of the conveyor device can be reduced.

According to another characteristic of the invention, the flexible unit of the conveyor carrier arms consists of a flexible plate, which is disposed such as to extend horizontally in the position for transport of the said conveyor carrier arms.

Furthermore, the recess is advantageously provided in the peripheral edge of the body, on the inner side of the said body, at a portion of the said peripheral edge which is disposed in the upper part of the body, in the position for transport of the conveyor carrier arms.

According to another characteristic of the invention, the peripheral edge of the body of the conveyor carrier arms comprises an inclined flat ramp for access to the recess. In fact, a ramp of this type facilitates locking of the conveyor carrier arm, and also makes it possible to limit the length of the surface along which the pin rubs after release takes place.

According to another characteristic of the invention, the release means comprise:
- for each conveyor carrier arm, a lower ejection heel, which projects beneath the body of the said conveyor carrier arm; and
- at each unloading area, a cam which is associated with pivoting means, which can make the cam tilt around a longitudinal axis, between an active position in which it is on the path of the ejection heels of the conveyor carrier arms, and gives rise to upward displacement of the said ejection heels, and initial tilting of the said conveyor carrier arms, and a passive position, in which the said cam permits passage of the ejection heel.

In addition, the conveyor carrier arms can be of the type which comprises a central bar, which extends transversely relative to the endless chain, and a plurality of fingers which are disposed at right angles, and are distributed on both sides of the central bar. In this case, the body of these conveyor carrier arms advantageously extends into the extension of the central bar, and has substantially the same width as the latter.

It should be noted that in this case, the width of the central bar of these conveyor carrier arms can be substantially reduced in comparison with that of the conveyor carrier arms of the conveyor device described in French patent FR 2,716,874. As a result, when the conveyor device according to the invention is fitted onto a sorting unit as described in this patent, the distance between centres of the support plates of the carriages of the weighing conveyor can be reduced, thus permitting acceptance and weighing of fruit of a very small size, or fruit with a shape other than spherical, such as pears.

According to another characteristic of the invention, for each conveyor carrier arm, each support comprises a transverse slide, which can accommodate the body of the said conveyor carrier arm, whilst permitting tilting of the latter. Slides of this type make it possible to guide the conveyor carrier arms whilst they are being tilted, thus eliminating risks of rupture and wear of the articulation shafts.

In addition, according to another characteristic of the invention:
  the endless chain is guided on a guide rail which is provided with a surface for travel of the said endless chain, and is supported by a longitudinal profiled section; and
  each support comprises a cover which is designed to accommodate the endless chain, and is provided with means for locking the said support onto the said endless chain.

The support structure of a conveyor device of this type is reduced in an optimum manner, since it consists mainly of a profiled support for the guide rail, on which the endless chain is displaced. In addition, a support structure of this type releases completely the space which is provided above the conveyor carrier arms, such that fruit of a large size can be transported.

In addition, in order to guarantee the transverse stability of the supports, the means for locking on the endless chain advantageously comprise a second cover, which is disposed inside the first cover, and has dimensions suitable to cover the guide rail, and, inside the said first cover, to delimit two lateral longitudinal spaces, which are designed to accommodate the links of the endless chain.

This second cover preferably additionally comprises outer catches for locking the endless chain in longitudinal spaces which are delimited by the said second cover.

According to another characteristic of the invention, each support supports two conveyor carrier arms which extend transversely on both sides of the said support. A conveyor device of this type thus comprises two conveyor lines, which are supported by a single line of supports which are guided on a single guide rail, and form a central separation between the said conveyor lines.

In addition, each support advantageously comprises, on both sides of the cover, transverse walls, which support the articulation shafts for the conveyor carrier arms. In addition, there are preferably two of these transverse walls, on each side of the cover, which are designed to delimit the slides which accommodate the bodies of the conveyor carrier arms.

According to another characteristic of the invention, each support comprises an upper wall with the general shape of an inverted V, formed by two faces which are inclined transversely.

According to another characteristic of the invention, the upper wall of each support comprises an axial longitudinal groove, the said conveyor device comprising a longitudinal guide rail which extends beneath the lower edge of the endless chain, and is designed to be accommodated in the said groove of the supports, such as to guide the supports without fatiguing the endless chain.

In addition, the means for pivoting of the cams advantageously comprise an electro-magnet, which is secured to the longitudinal profiled section by means of a ring, which is provided with means for detachable securing to the said profiled section, thus eliminating any need to adjust the relative position of the conveyor carrier arms and of the said electro-magnet, as a result of the fact that these two components are supported by a single profiled section.

According to another characteristic of the invention, for each conveyor line, the conveyor device comprises a re-engagement disc, which is supported by the transverse shaft of the toothed wheel downstream, and is disposed such as to be on the path of the conveyor carrier arms.

In addition, for each conveyor line, it advantageously comprises a disc which is provided with a peripheral strip of foam, which is supported by the transverse shaft of the toothed wheel downstream, and is disposed such as to be on the path of the ejection heels of the conveyor carrier arms, and to damp the noise caused by locking of the conveyor carrier arms.

Other characteristics, objects and advantages of the invention will become apparent from the following detailed description, provided with reference to the attached drawings, which represent a preferred embodiment, by way of non-limiting example. In these drawings.

Figure 1:
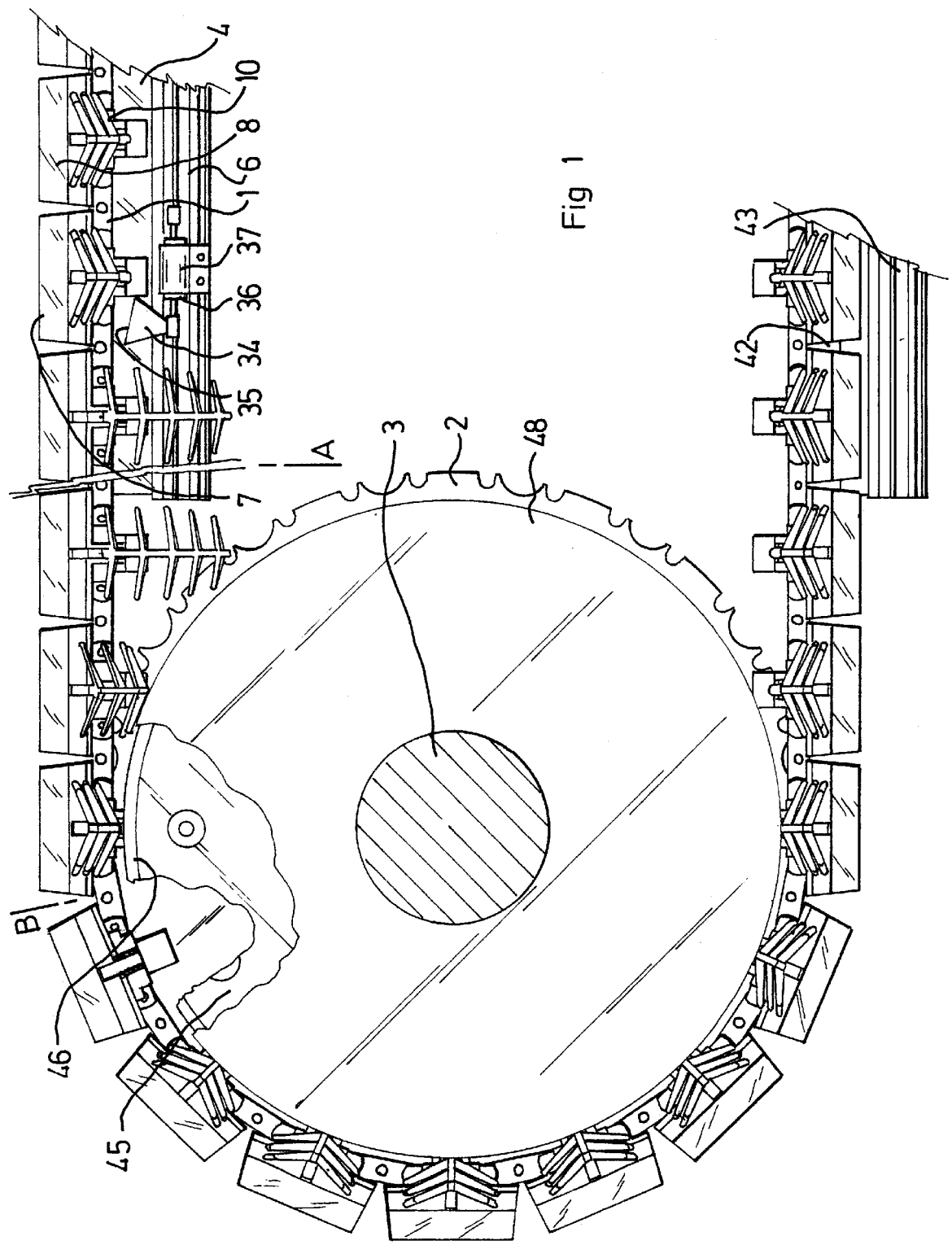
FIG. 1 is a partial longitudinal view, with cut-out sections, of a conveyor device according to the invention.
Figure 2:
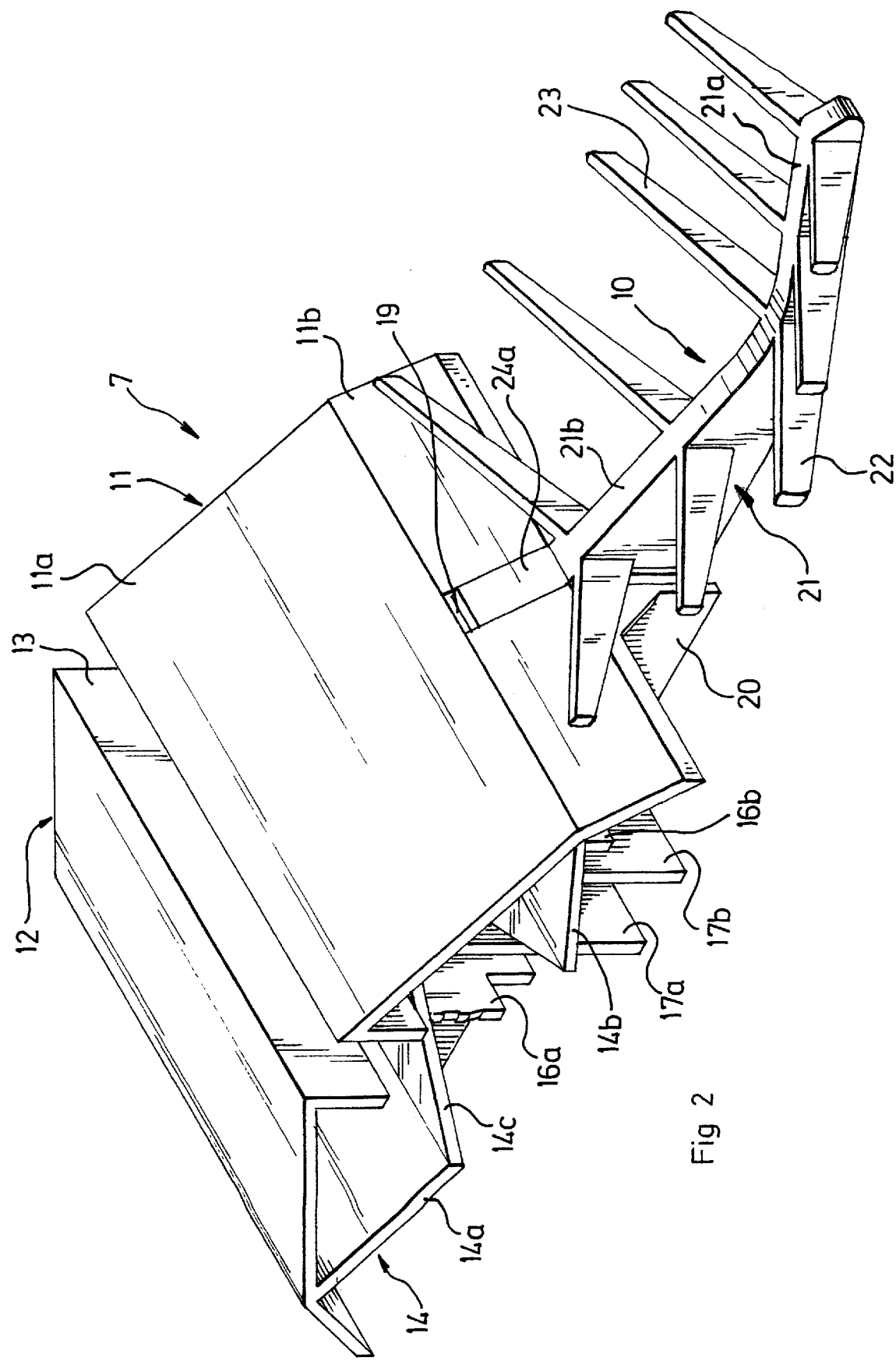
FIG. 2 is a perspective view of a support for conveyor carrier arms according to the invention, in which a single one of the two conveyor carrier arms is shown.

The conveyor device shown in FIG. 1 is designed to provide transport of fruit and vegetables, and, according to predetermined selection criteria, to permit selective discharge of the said fruit or vegetables at unloading areas, disposed one after another, along the path of the said conveyor device.

A conveyor device of this type is designed in particular to be integrated in a sorting unit such as described in French patent FR 2,716,874, and to constitute the second conveyor of this conveyor unit, which provides transport of fruit or vegetables between the area for loading and optical analysis of the latter, and the unloading areas, and along the path of which there is interposed an intermediate conveyor, which is designed to receive the fruit or vegetables temporarily, for the purpose of weighing of the latter.

This conveyor device firstly comprises an endless chain 1, which is engaged around two toothed wheels, a single one of which, the downstream toothed wheel 2, is shown in FIG. 1, each of which is supported by a transverse shaft such as 3.

At the upper edge of the conveyor device, this endless chain 1 is supported by a horizontal longitudinal profiled section 4 with a rectangular cross-section, made of polyethylene, which forms a guide rail for the said endless chain, on which the rollers of the latter are displaced.

This guide rail 4 is itself supported by an aluminium profiled section 6, which is provided for this purpose with a horizontal upper groove 5, into which the lower part of the said guide rail is forced.

Secondly, the conveyor device comprises a plurality of supports such as 7, 8, which are designed to be locked onto the endless chain 1, each of which supports two conveyor carrier arms 9, 10, which extend transversely on both sides of the said supports, and are articulated on the latter such that they can pivot between a position for transport of the fruit and vegetables, and a tilted position for discharge of the said fruit or vegetables at an unloading area.

Each of these supports 7, 8 firstly comprises an upper wall in the shape of a truncated dihedron, consisting of two faces 11, 12 which are inclined transversely, and extend on both sides of a central longitudinal groove 13, which is centred on the longitudinal axis of the conveyor device.

In addition, each face 11, 12 has a double incline, and comprises a first, median strip with a width 11a, which juxtaposes the slot 13, and has inclination which is less than that of a second, lateral strip which has a width 11b.

Each support 7, 8 additionally comprises a lower wall 14, which, together with the median strips 11a of the faces 11, 12 of the upper wall, is designed to delimit a volume, the transverse cross-section of which is in the general shape of a rhombus.

For this purpose, this lower wall 14, comprises two symmetrical inclined lateral faces 14a, 14b, which are connected by a horizontal central strip 14c.

In addition, longitudinal braces such as 15 are provided between the upper walls 11, 12 and lower wall 14, and are disposed such as to extend between the base of the groove 13 and the central strip 14c.

Each support 7, 8 additionally comprises two vertical longitudinal walls 16a, 16b, which extend beneath the central strip 14c of the lower wall 14, and delimit together with the latter a cover with a width equivalent to that of the endless chain 1, which can accommodate the latter, and has a depth greater than the thickness of the said endless chain.

In addition, inside the aforementioned cover, each support 7, 8 comprises two other longitudinal walls 17a, 17b, with heights greater than those of the vertical walls 16a, 16b, which delimit inside the first cover:

firstly, together with the central strip 14c of the lower wall 14, a second cover which has a width and depth designed to cover the quasi totality of the portion of height of the guide rail 4 which projects from the groove 5 of the aluminium profiled section 6; and secondly, together with the vertical walls 16a, 16b, two longitudinal spaces, in which there are accommodated the links of the endless chain 1.

In addition, each vertical wall 17a, 17b has a catch 18 for locking the links of the endless chain 1 inside longitudinal spaces which are delimited by the walls 16a, 16b and the said walls 17a, 17b.

Each support 7, 8 also comprises two pairs of transverse walls such as 20, which are disposed respectively on each side of the longitudinal walls 16a, 16b, and are delimited firstly by the said longitudinal walls 16a, 16b, and secondly by the lower wall 14 and upper walls 11, 12, such as to define two transverse slides such as 19, flush with which, in addition, the lateral strips 11b of the faces 11, 12 of the upper wall have an indentation.

Each of the conveyor carrier arms 9, 10, which is made of a material such as polyacetyl, which has a shape memory, comprises a central bar 21, with a shape which is concave longitudinally, on both sides of which there extend at right angles a plurality of fingers such as 22, 23, which are disposed opposite one another, and are curved upwards, such as to impart to the conveyor carrier arm the form of a bowl which is extended transversely relative to the endless chain 1, and can accommodate a piece of fruit or a vegetable.

The central bar 21, which has a width which is substantially constant throughout its length, seen laterally in elevation, and on both sides of its point of inflexion, additionally has a first end section 21a with a constant thickness, and a second section 21b with a thickness which increases from the said point of inflexion, thus imparting to the said second section, seen in elevation, the general shape of a right-angled triangle, the base of which extends substantially horizontally in the position for transport of the conveyor carrier arms 9, 10, and of which the hypotenuse forms the upper surface for receipt of the fruit or vegetables.

In the extension of the second section 21b of the central bar 21, each conveyor carrier arm 9, 10 additionally comprises a "body" 24 for articulation of the said conveyor carrier arm on a support 7, 8, which is designed to be inserted in one of the transverse slides 19 of the said support.

This body 24, which has a width substantially equivalent to that of the central bar 21, which, as previously described, is designed to be inserted in one of the slides 19 of the supports 7, 8, is additionally hollow, and is delimited by a peripheral edge 25, which has:

a front section portion 25a, which extends in the continuity of the upper surface of the transverse bar 21, and, in the locked position of the conveyor carrier arms 9, 10, has inclination conjugated with that of the lateral strip 11b of the upper wall of the support 7, 8, which is designed to extend together with the upper surface of the said lateral strip;

a lower section portion 25b, which extends in the continuity of the base of the second section 21b of the central bar 21; and a curved rear section portion 25c.

This body additionally comprises a rear heel 26, which projects beneath the lower section 25b of the peripheral edge 25.

It also comprises an inner locking recess 27, which is provided substantially at the intersection of the front section 25a and rear section 25c of the peripheral edge 25, and is designed to accommodate a longitudinal shaft 28, which extends through the apertures provided in the transverse walls 20, which delimit each slide 19 of the supports 7, 8, such as to maintain the conveyor carrier arms 9, 10 in their position for transport of the fruit or vegetables.

In addition, the rear section 25c of the peripheral edge 25 has on its interior an inclined flat ramp 29 for access to the recess 27, which extends in the continuity of the curved portion of the said rear section.

Finally, this body 24 comprises an inner longitudinal sleeve 31, which is provided at the end of a deformable flexible plate 32, which, at its other end, is integral with the rear section 25c of the peripheral edge 25, and is disposed such that it extends horizontally in the position for transport of the conveyor carrier arms.

This inner sleeve 31 constitutes a bearing which accommodates the longitudinal articulation shaft 33 of the conveyor carrier arms 9, 10, which extends through apertures provided in the transverse walls 20, which delimit each slide 19 of the supports 7, 8.

The conveyor device additionally comprises means for release, which are designed to give rise selectively to tilting of the conveyor carrier arms 9, 10 at the unloading areas.

Figure 3:
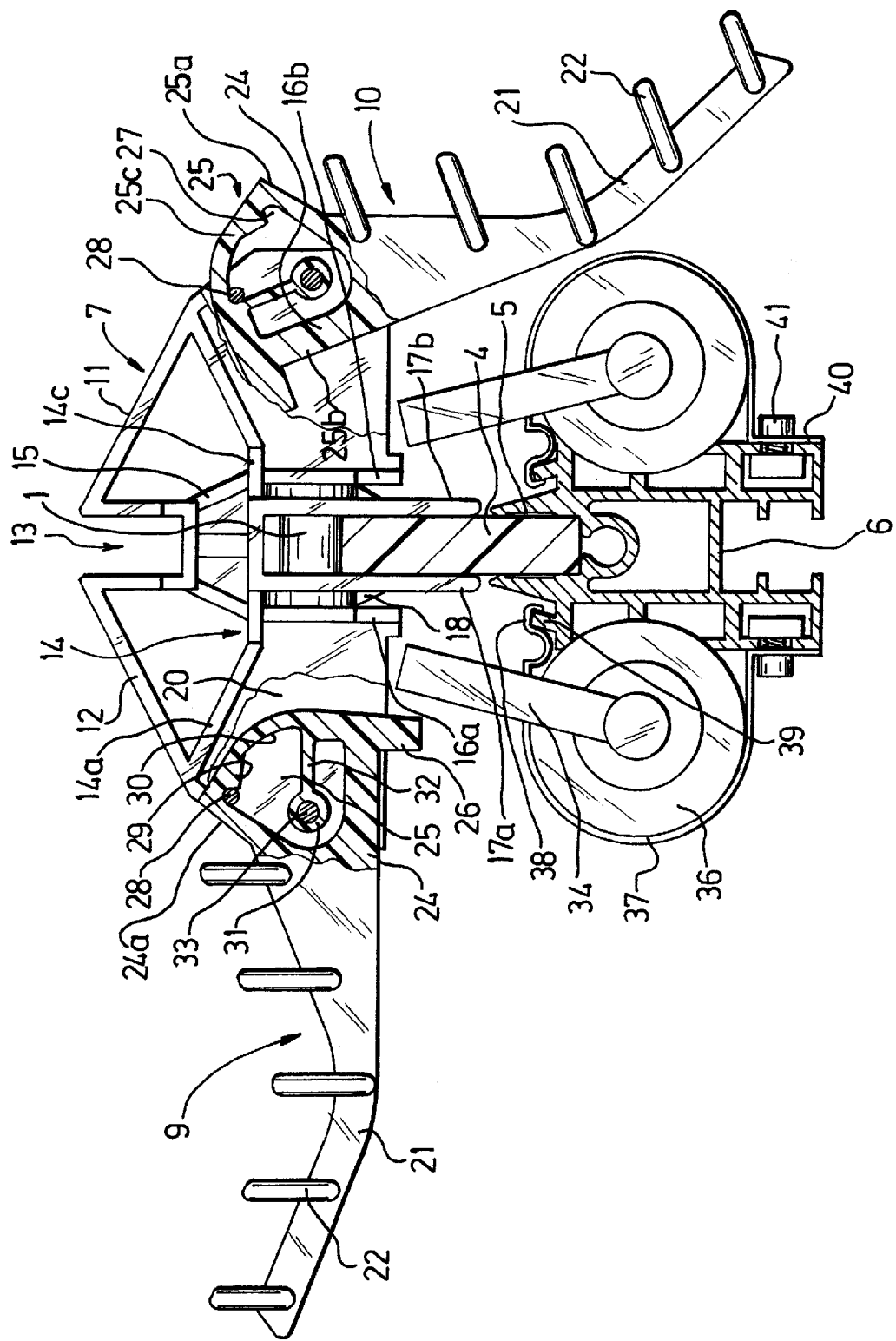
FIG. 3 is a transverse cross-section through a vertical plane A of the conveyor device according to the invention, in which there are shown, firstly, a conveyor carrier arm in a tilted position, and a conveyor carrier arm in a locked position, and secondly, the means for release of these conveyor carrier arms.
Figure 4:
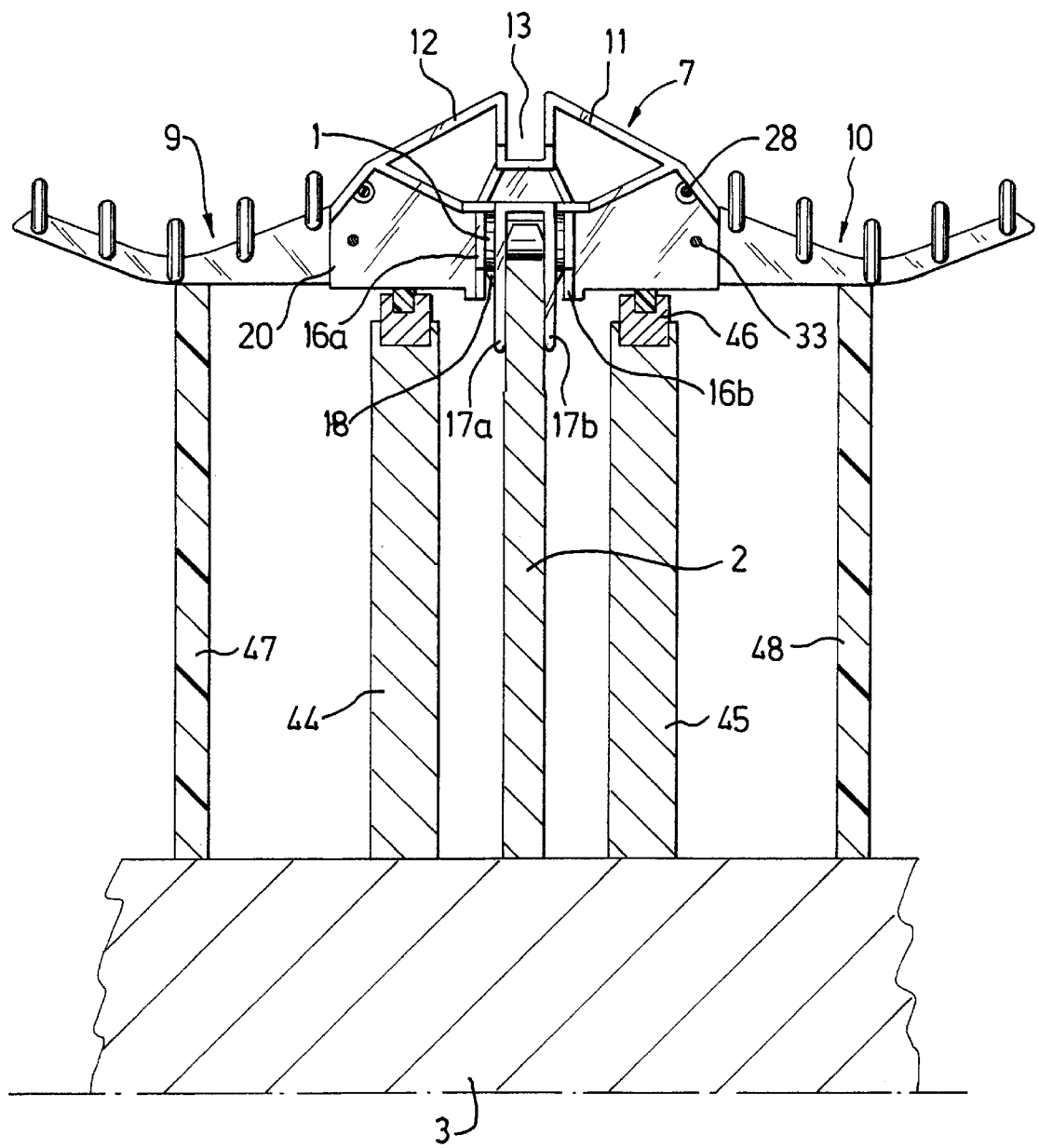
FIG. 4 is a transverse cross-section through a plane B of this conveyor device.

These means for release comprise a cam 34, which is provided with an inclined flat upper surface 35, which rises, looking in the direction of travel of the conveyor device, the said cam being supported by an electro-magnet 36, which can make the cam tilt around a longitudinal axis between two positions, i.e.:

- an active position, in which this cam 34 extends substantially vertically, and is on the path of the heels 26 of the conveyor carrier arms 9, 10, and in which, as a result of its profile, it gives rise to displacement upwards of the said heels, and tilting of the said conveyor carrier arms, which is made possible by the capacity for deformation of the flexible plate 32; and
- a passive position shown in FIG. 3, in which this cam 34 is inclined in the direction of the guide rail 4, and permits passage of the heels 26 of the conveyor carrier arms 9, 10.

Each electro-magnet 36 is also mounted on one of the lateral surfaces of the profiled section 6, by means of substantially semi-cylindrical rings 37, which have firstly, at their upper longitudinal edge, a profile 38 for hooking onto longitudinal ribs 39 with which the said profiled section is provided, and secondly, a flat lower edge 40, for support against the profiled section 6, thus making it possible to render the said ring integral on the latter by means of screws 41.

Additionally, at the lower edge of the endless chain 1, the conveyor device comprises a guide rail 42, and a profiled section 43, which are similar to the guide rail 4 and the profiled section 6, the said guide rail having a width which is designed to be accommodated in the central groove 13 of the supports 7, 8, such as to guide the said supports without wearing the endless chain 1.

This conveyor device additionally comprises means for re-engagement of the conveyor carrier arms 9, 10, which are designed to make the latter pivot from their tilted position towards their locked position. These means for re-engagement consist of two polyethylene discs 47, 48, which are supported by the transverse shaft 3 of the toothed wheel 2 downstream, on both sides of the latter, such as to be disposed on the path of the conveyor carrier arms 9, 10, in order to make the latter pivot towards their position for transport.

Finally, the conveyor device comprises two other polyethylene discs 44, 45, which are supported by the transverse shaft 3 of the toothed wheel 2 downstream, and are disposed between the said toothed wheel and the re-engagement discs 47, 48, such as to be located on the path of the heels 26 of the conveyor carrier arms 9, 10.

These two discs 44, 45 are encircled by a peripheral strip of foam 46, which acts as a sound damper, to damp the noise caused by locking of the conveyor carrier arms.

What is claimed is:

1. A device for conveying products, in particular fruit, which is designed to provide transport of the said products, and selective discharge of the latter at unloading areas, and comprising:
    a plurality of conveyor carrier arms (9, 10), which are articulated on supports (7, 8) which are supported by a longitudinal endless chain (1), and are provided with units (27, 28) for maintenance of the said conveyor carrier arms in a position for transport of the products;
    means for release (34–36), which are designed to generate selectively tilting of the conveyor carrier arms (9, 10), for the purpose of discharge of the products supported by the latter in one of the unloading areas; wherein, in the said conveyor device:
    each conveyor carrier arm (9, 10) is extended transversely by a hollow body (24) delimited by a peripheral edge (25), inside which there extends a longitudinal sleeve (31) which accommodates a longitudinal articulation shaft (33), which is integral with the support (7, 8), the said sleeve being connected to the peripheral edge (25) by a transverse flexible component (32) which can be deformed during a force of raising of the conveyor carrier arm (9, 10), disposed in its position for transport of the products; and
    the units for maintenance of the conveyor carrier arms (9, 10) in their position for transport of the products comprise a recess (27) which is provided in the body (24) of the said conveyor carrier arm, and a longitudinal pin (28) which is integral with the support (7, 8), and is disposed such as to be accommodated in the recess (27), in the position for transport of the conveyor carrier arms (9, 10), the said recess being disposed such as to release the pin (28) during deformation of the flexible unit (32), derived from a force of raising of the said conveyor carrier arms.

2. A conveyor device as claimed in claim 1, wherein the flexible unit of the conveyor carrier arms (9, 10) consists of a flexible plate (32), which is disposed such as to extend horizontally in the position for transport of the said conveyor carrier arms.

3. A conveyor device as claimed in claim 1, wherein the recess (27) is provided in the peripheral edge (25) of the body (24), on the inner side of the said body, at a portion of the said peripheral edge which is disposed in the upper part of the body (24), in the position for transport of the conveyor carrier arms (9, 10).

4. A conveyor device as claimed in claim 3, wherein the peripheral edge (25) of the body (24) of the conveyor carrier arms (9, 10) comprises an inclined flat ramp (30) for access to the recess (27).

5. A conveyor device as claimed in claim 1, wherein the release means comprise:
    for each conveyor carrier arm (9, 10), a lower ejection heel (26), which projects beneath the body (24) of the said conveyor carrier arm; and
    at each unloading area, a cam (34) which is associated with pivoting means (36), which can make the cam tilt around a longitudinal axis, between an active position in which it is on the path of the ejection heels (26) of the conveyor carrier arms (9, 10) and gives rise to upward displacement of the said ejection heels, and initial tilting of the said conveyor carrier arms, and a passive position, in which the said cam permits passage of the ejection heel (26).

6. A conveyor device as claimed in claim 1, in which the conveyor carrier arms (9, 10) comprise a central bar (21) which extends transversely relative to the endless chain (1), and a plurality of fingers (22, 23) which are disposed at right angles, and are distributed on both sides of the said central bar, in which, in the said conveyor device, the body (24) of the said conveyor carrier arms extends into the extension of the central bar (21), and has substantially the same width as the latter.

7. A conveyor device as claimed in claim 6, wherein each support (7, 8) comprises, for each conveyor carrier arm (9, 10), a transverse slide (19) which can accommodate the body (24) of the said conveyor carrier arm, whilst permitting tilting of the latter.

8. A conveyor device as claimed in claim 1, wherein:
    the endless chain (1) is guided on a guide rail (4) which is provided with a surface for travel of the said endless chain, and is supported by a longitudinal profiled section (16); and each support (7, 8) comprises a cover (16a, 16b) which is designed to accommodate the endless chain (1), and is provided with means (17a, 17b, 18) for locking the said support onto the endless chain.

9. A conveyor device as claimed in claim 8, wherein the means for locking the supports (7, 8) comprise a second cover (17a, 17b), which is disposed inside the first cover (16a, 16b), and has dimensions suitable to cover the guide rail (4), and, inside the said first cover, to delimit two lateral longitudinal spaces which are designed to accommodate the links of the endless chain (1).

10. A conveyor device as claimed in claim 9, wherein the second cover (17a, 17b) comprises outer catches (18) for locking the endless chain (1) inside longitudinal spaces which are delimited by the said second cover.

11. A conveyor device as claimed in claim 8, wherein each support (7, 8) supports two conveyor carrier arms (9, 10), which extend transversely on both sides of the said support.

12. A conveyor device as claimed in claim 11, wherein each support (7, 8) comprises, on both sides of the cover (16a, 16b), transverse walls (20) which support the articulation shafts (33) for the conveyor carrier arms (9, 10).

13. A conveyor device as claimed in claim 12, wherein, on each side of the cover (16a, 16b), each support (7, 8) comprises two transverse walls (20), which delimit a slide (19) for the conveyor carrier arm (9, 10).

14. A conveyor device as claimed in claim 11, wherein each support (7, 8) comprises an upper wall (11, 12) with the general shape of an inverted V, formed by two faces which are inclined transversely.

15. A conveyor device as claimed in claim 14, wherein the upper wall (11, 12) of each support (7, 8) comprises an axial longitudinal groove (13), the said conveyor device comprising a longitudinal guide rail (42) which extends beneath the lower edge of the endless chain (1), and is designed to be accommodated in the said groove of the supports.

16. A conveyor device as claimed in claim 8, wherein the means for pivoting of the cams (34) comprise an electromagnet (36), which is secured to the longitudinal profiled section (6) by means of a ring (37), which is provided with means (14) for detachable securing to the said profiled section.

17. A conveyor device as claimed in claim 1, comprising two toothed wheels (2) upstream and downstream, for engagement of the endless chain (1), wherein for each conveyor line, it comprises a re-engagement disc (47, 48), which is supported by the transverse shaft (3) of the toothed wheel (2) downstream, and is disposed such as to be on the path of the conveyor carrier arms (9, 10).

18. A conveyor device as claimed in claim 17, wherein it comprises, for each conveyor line, a disc (44, 45), which is provided with a peripheral strip of foam (46), which is supported by the transverse shaft (3) of the toothed wheel (2) downstream, and is disposed such as to be on the path of the ejection heels (26) of the conveyor carrier arms (9, 10).

* * * * *